US009619129B2

(12) United States Patent
Herold

(10) Patent No.: US 9,619,129 B2
(45) Date of Patent: *Apr. 11, 2017

(54) SHARING DIGITAL ITEMS VIA A SOCIAL NETWORKING SYSTEM

(71) Applicant: FACEBOOK, INC., Menlo Park, CA (US)

(72) Inventor: June R. Herold, Falls Church, VA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/869,970

(22) Filed: Sep. 29, 2015

(65) Prior Publication Data

US 2016/0085434 A1 Mar. 24, 2016

Related U.S. Application Data

(63) Continuation of application No. 14/160,210, filed on Jan. 21, 2014, now Pat. No. 9,182,893, which is a (Continued)

(51) Int. Cl.
| | |
|---|---|
| G06F 15/00 | (2006.01) |
| G06F 13/00 | (2006.01) |
| G06F 3/0484 | (2013.01) |
| G06Q 10/10 | (2012.01) |
| G06F 17/24 | (2006.01) |

(Continued)

(52) U.S. Cl.
CPC ........ *G06F 3/04847* (2013.01); *G06F 3/0481* (2013.01); *G06F 3/0484* (2013.01); *G06F 15/16* (2013.01); *G06F 17/241* (2013.01); *G06F 21/60* (2013.01); *G06Q 10/107* (2013.01); *H04L 51/04* (2013.01); *H04L 51/046* (2013.01);
(Continued)

(58) Field of Classification Search
CPC ............................. H04L 67/104; G06Q 10/00
USPC ................. 715/759, 743, 744, 740, 761–765
See application file for complete search history.

(56) References Cited

U.S. PATENT DOCUMENTS

| | | | |
|---|---|---|---|
| 5,239,466 A | 8/1993 | Morgan et al. | |
| 6,643,658 B1 | 11/2003 | Jai et al. | |

(Continued)

OTHER PUBLICATIONS

U.S. Appl. No. 12/839,129, filed Jul. 19, 2010, Herold.
(Continued)

*Primary Examiner* — Kevin Nguyen
(74) *Attorney, Agent, or Firm* — Keller Jolley Preece

(57) ABSTRACT

A user may make a digital item available to other users of a computer network, such as an instant messaging system, a chat environment, or a subscription-based computer network. Examples of digital items that may be shared with other users include digital representations of graphic images, photographs, audio segments, songs, video segments, movies, and text (such as lists of favorites (e.g., a list of favorite books, a list of favorite movies, and a list of favorite places to visit)). On-line presence information is provided to indicate the on-line presence of users with whom a digital item has been shared, may be shared or is being shared. For instance, an indication of the on-line or offline status of a user with whom an item has been shared or is being shared may be presented.

20 Claims, 11 Drawing Sheets

Related U.S. Application Data continuation of application No. 13/947,283, filed on Jul. 22, 2013, now abandoned, which is a continuation of application No. 13/619,169, filed on Sep. 14, 2012, now Pat. No. 8,775,887, which is a continuation of application No. 12/839,129, filed on Jul. 19, 2010, now Pat. No. 9,280,511, which is a continuation of application No. 11/252,037, filed on Oct. 18, 2005, now Pat. No. 7,783,980.

(60) Provisional application No. 60/668,998, filed on Apr. 7, 2005.

(51) Int. Cl.
  *G06F 21/60* (2013.01)
  *H04L 12/58* (2006.01)
  *G06F 15/16* (2006.01)
  *G06F 3/0481* (2013.01)
  *H04L 29/08* (2006.01)
  *G06Q 50/00* (2012.01)

(52) U.S. Cl.
  CPC .............. *H04L 51/10* (2013.01); *H04L 67/10* (2013.01); *G06Q 50/01* (2013.01)

(56) References Cited

U.S. PATENT DOCUMENTS

| | | |
|---|---|---|
| 6,687,878 B1 | 2/2004 | Einracht et al. |
| 7,353,252 B1 | 4/2008 | Yang et al. |
| 7,783,980 B1 | 8/2010 | Herold |
| 8,775,887 B2 | 7/2014 | Herold |
| 9,069,449 B2 | 6/2015 | Herold |
| 9,122,381 B2 | 9/2015 | Herold |
| 2003/0009566 A1 | 1/2003 | Christensen et al. |
| 2003/0028395 A1 | 2/2003 | Rodgers et al. |
| 2004/0003352 A1 | 1/2004 | Bargeron et al. |
| 2004/0148347 A1 | 7/2004 | Appelman et al. |
| 2004/0201668 A1* | 10/2004 | Matsubara ............ H04L 67/104 348/14.05 |
| 2004/0237033 A1 | 11/2004 | Woolf et al. |
| 2005/0138566 A1* | 6/2005 | Muller ................ G06Q 10/00 715/759 |
| 2005/0223315 A1 | 10/2005 | Shimizu et al. |
| 2006/0009243 A1 | 1/2006 | Dahan et al. |
| 2006/0075071 A1 | 4/2006 | Gillette |
| 2011/0138004 A1 | 6/2011 | McConn et al. |
| 2013/0311895 A1 | 11/2013 | Herold |
| 2014/0136983 A1 | 5/2014 | Herold |

OTHER PUBLICATIONS

Brent Heslop, et al., Microsoft Office Word 2003 Bible, Chapter 29, pp. 697-704 (2003).
Amy Pearl, "System Support for Integrated Desktop Videoconferencing," Chapter 34, The McGraw-Hill Multimedia Handbook, pp. 34.1-34.12 (1994).
Kazuo Watabe, et al, "Distributed Multiparty Desktop Conferencing System: Mermaid", Proceedings of the Conference on Computer-Supported Cooperative Work, CSCW'90 (Oct. 7-10, 1990).
Microsoft Office Outlook 2003 (Commercial Software Product), Outlook Help: Share My Notes, p. 1 of 1; http://office.microsoft.com/assistance (Mar. 4, 2005).
U.S. Appl. No. 11/252,012, filed Mar. 2, 2009, Office Action.
U.S. Appl. No. 11/252,012, filed Sep. 10, 2009, Office Action.
U.S. Appl. No. 11/252,012, filed Dec. 15, 2009, Office Action.
U.S. Appl. No. 11/252,012, filed May 13, 2010, Office Action.
U.S. Appl. No. 11/252,012, filed Oct. 25, 2010, Office Action.
U.S. Appl. No. 11/252,012, filed Jun. 9, 2011, Office Action.
U.S. Appl. No. 11/252,012, filed Nov. 28, 2011, Notice of Allowance.
U.S. Appl. No. 11/252,037, filed Jun. 25, 2009, Office Action.
U.S. Appl. No. 11/252,037, filed Jan. 27, 2010, Office Action.
U.S. Appl. No. 11/252,037, filed Apr. 28, 2010, Notice of Allowance.
U.S. Appl. No. 12/839,129, filed Nov. 5, 2013, Office Action.
U.S. Appl. No. 12/839,129, filed Apr. 24, 2014, Office Action.
U.S. Appl. No. 12/839,129, filed Oct. 6, 2014, Office Action.
U.S. Appl. No. 12/839,129, filed Jun. 1, 2015, Office Action.
U.S. Appl. No. 13/619,169, filed Mar. 26, 2013, Office Action.
U.S. Appl. No. 13/619,169, filed Oct. 7, 2013, Notice of Allowance.
U.S. Appl. No. 13/619,169, filed Apr. 11, 2014, Notice of Allowance.
U.S. Appl. No. 13/947,283, filed Dec. 5, 2013, Office Action.
U.S. Appl. No. 13/947,311, filed Dec. 18, 2013, Office Action.
U.S. Appl. No. 13/947,311, filed Mar. 28, 2014, Office Action.
U.S. Appl. No. 13/947,311, filed Oct. 6, 2014, Office Action.
U.S. Appl. No. 13/947,311, filed Apr. 16, 2015, Notice of Allowance.
U.S. Appl. No. 14/160,210, filed Nov. 19, 2014, Office Action.
U.S. Appl. No. 14/160,210, filed Apr. 15, 2015, Office Action.
U.S. Appl. No. 14/160,210, filed Jul. 30, 2015, Notice of Allowance.
U.S. Appl. No. 14/331,728, filed Feb. 3, 2015, Office Action.
U.S. Appl. No. 14/331,728, filed May 18, 2015, Notice of Allowance.
U.S. Appl. No. 12/839,129, filed Nov. 6, 2015, Notice of Allowance.

* cited by examiner

SHARING DIGITAL ITEMS VIA A SOCIAL NETWORKING SYSTEM

CROSS REFERENCE TO RELATED APPLICATIONS

The present application is a continuation of U.S. application Ser. No. 14/160,210, filed Jan. 21, 2014, which is a continuation of U.S. application Ser. No. 13/947,283, filed Jul. 22, 2013, which is a continuation of U.S. application Ser. No. 13/619,169, filed Sep. 14, 2012, which is now issued as U.S. Pat. No. 8,775,887, which is a continuation of U.S. application Ser. No. 12/839,129, filed Jul. 19, 2010, which is a continuation of U.S. application Ser. No. 11/252,037, filed Oct. 18, 2005, which is now issued as U.S. Pat. No. 7,783,980, which claims the benefit of and priority to U.S. provisional application No. 60/668,998, filed Apr. 7, 2005. Each of the aforementioned patent(s) and application(s) are hereby incorporated by reference in their entirety.

TECHNICAL FIELD

This description relates to controlling distribution of information related to digital items that are shared with users over a computer network.

BACKGROUND

On-line services may provide users with the ability to send and receive instant messages. Instant messages may be exchanged in a private on-line conversation between two or more people who have access to an instant messaging service and who have installed communications software necessary to access and use the instant messaging service. A participant list that includes the communications identities with which a user exchanges instant messages may be displayed for a user and may be used to establish instant messaging sessions with those other identities. The participant list may indicate whether each identity associated with the participant list is on-line.

SUMMARY

In one general aspect, a graphical user interface on a display device is generated for using a computer to share digital items. The graphical user interface includes an item display and a participant list display. The item display includes digital items, where at least one digital item is associated with a user and also is associated with one or more communication identities to whom the user has granted permission to view the digital item. The participant list display includes the communication identities and presence information associated with the communication identities. The presence information indicates whether a particular communication identity is on-line. The graphical user interface also includes a control element for managing digital items so as to control communications identities to whom access to a digital item is to be provided.

Implementations may include one or more of the following features. For example, the participant list display may include a communication identity only when presence information associated with the communication identity reflects that the communication identity is on-line. The participant list display may include a presence indication of whether a communication identity is on-line and may include categories of communication identities such that a category is associated with one or more communications identities.

The participant display may include an on-line category that is associated with one or more on-line communication identities when presence information associated with the one or more on-line communication identities reflects that the one or more communication identities are on-line. The participant display may include an offline category that is associated with one or more offline communication identities when presence information associated with the offline communication identities reflects that the one or more offline communication identities are offline.

The participant display may include a category that is associated with the digital item and the one or more communication identities to whom the user has granted permission to view the digital item. The participant display may include a category that is associated with the digital item and the one or more communication identities to whom the user has granted permission to view the digital item when presence information associated with the communication identity reflects that the one or more communication identities are on-line.

A digital item may be associated with annotation text. A digital item may include, for example, a graphical image, a digitized photograph, an audio segment, a digital video segment, or text. A digital item may include a list of multiple digital items.

In another general aspect, digital items are shared with communication identities by receiving an indication of a digital item that is capable of being accessed over a network of computers and receiving an indication of a communication identity to whom a user has granted permission to view the indicated digital item over the network of computers. An indication is presented to the user of whether the communication identity is currently accessible using the network of computers. The indication is presented in association with the digital item that the communication identity is permitted to view.

Implementations may include one or more of the features noted above and one or more of the following features. For example, an indication may be presented to the user of whether the communication identity is on-line or whether the communication identity is off-line. The user may be an end-user of the network of computers used to present the indication of whether the communication identity is currently accessible using the network of computers.

Implementations of any of the techniques described may include a method or process, an apparatus or system, or computer software on a computer-accessible medium. The details of particular implementations are set forth below. Other features will be apparent from the description and drawings, and from the claims.

DESCRIPTION OF DRAWINGS

Like reference symbols in the various drawings indicate like elements.

DETAILED DESCRIPTION

Figure 1:
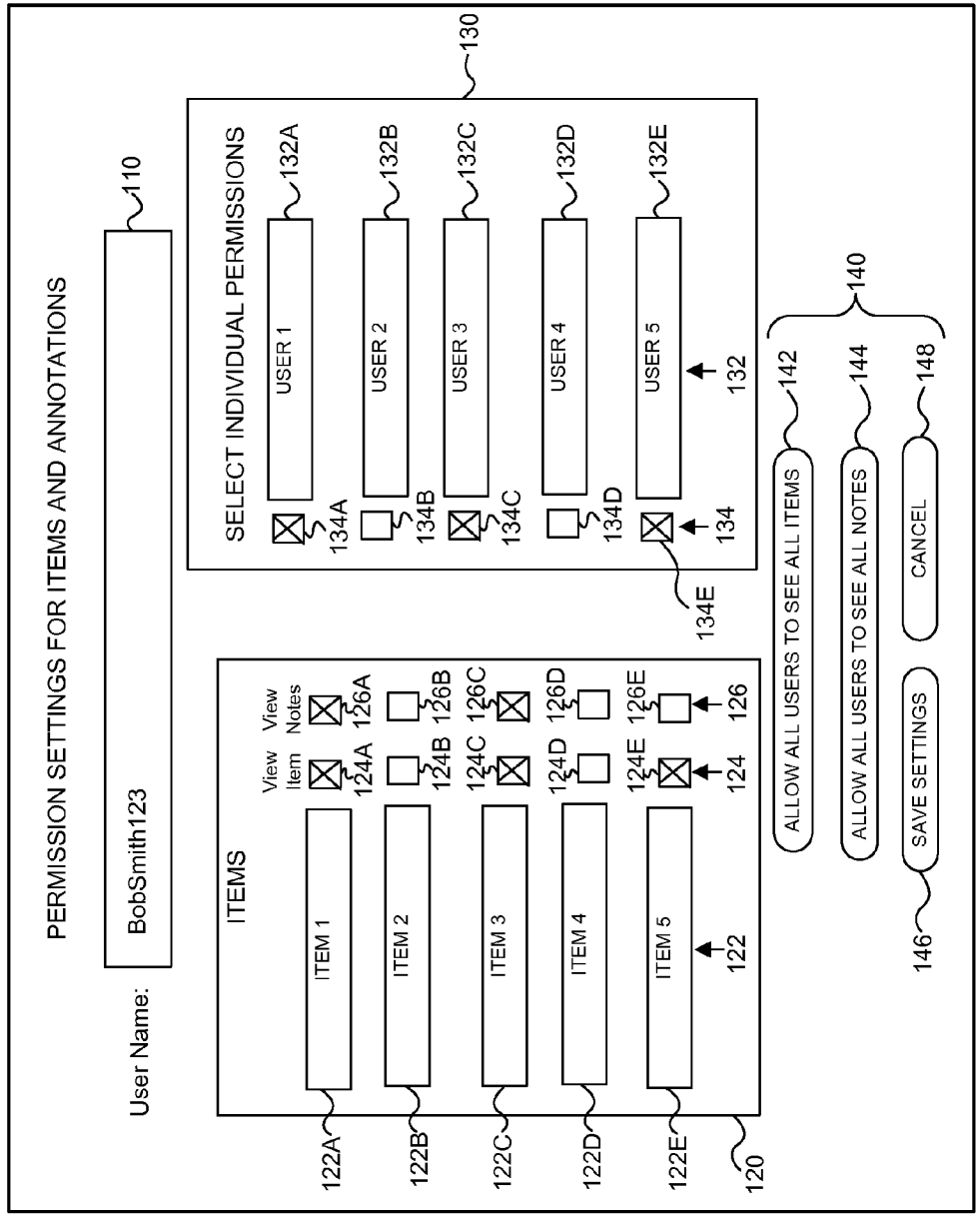
FIGS. 1 and 3 are diagrams of an exemplary user interface for enabling a user to permit another user access to a digital item and user-entered annotations related to the digital item.

An instant messaging user may use a participant or contact list that includes a user-selected list of potential instant messaging recipients ("friends") to identify another instant messaging user with whom instant messages are to be exchanged. The participant or contact list may be referred to as a friends list. An instant messaging user also may use a friends list for other purposes, such as to indicate which friends are permitted to access digital items and annotations related to digital items that are associated with the user and accessible through a network of computer systems.

More particularly, techniques are described for user-controlled annotation and sharing of digital items and presentation of on-line presence information related to users with whom digital items are shared.

In one general aspect, techniques are described for user-controlled annotation and sharing of one or more digital items. Examples of digital items that may be shared with other users include digital representations of graphic images, photographs, audio segments, songs, video segments, movies, and text (such as lists of favorites (e.g., a list of favorite books, a list of favorite movies, and a list of favorite places to visit)). A user may make a digital item available to other users of a computer network, such as an instant messaging system, a chat environment, or a subscription-based computer network (such as a network provided by an Internet service provider (ISP)).

In one example, a user of the computer network may load a digital representation of a photograph or an audio segment onto the computer network to make the digital item available to others. For instance, a user may load personal photographs or video segments to share with the user's friends. In another example, a user may select one or more digital items that are available through the computer network to share with other users. For instance, a user may select photographs from an on-line dating application to share with the user's friends, or a user may select songs from an on-line music collection to share with the user's friends.

The user who made the digital item available may be referred to as the owner of the digital item. Similarly, a user who made a collection or list of digital items available may be referred to as the owner of the collection or list of digital items.

User-entered annotations, such as textual comments, may be associated with a digital item, and the owner of the digital item can select which other users can view and/or change all, or some, of the annotations. In some implementations, the owner also may be able to share a link that enables a user who accesses the link to join a chat or instant messaging (IM) session regarding one or more digital items. Additionally or alternatively, the owner may control whether users with whom items have been shared may delegate authority to other users to annotate and/or view all or some of the shared items.

The described techniques may be applicable to the context of on-line dating. For example, a user may like to share his or her hit lists or favorite dating prospects with other users and solicit input from the other users. More particularly, in the context of an on-line dating application or service, a user may create a list of prospects, favorites, or "keepers" from a larger collection of dating prospects generally available to users of the on-line dating application. The user is given the opportunity to share the list with other users and to solicit comments about the entries in the list. The user can administratively select whether the other users' comments will be seen by all with whom the list is shared or only by the sharing user. Other users may access the shared list and may be provided with an electronic notepad (or other type of mechanism) through which to annotate individual entries in the shared list.

In another general aspect, on-line presence information is provided to indicate the on-line presence of users with whom a digital item has been shared, may be shared or is being shared. For instance, an indication of the on-line or offline status of a user with whom an item has been shared or is being shared may be presented.

FIG. 1 shows an exemplary graphical user interface 100 for enabling a user to permit another user to access a digital item and user-entered annotations related to the digital item. An annotation also may be referred to as a note or a comment. An annotation that is related to a digital item also may be referred to as an annotation that is associated with a digital item or as an annotation that corresponds to a digital item.

The user interface 100 includes a user indicator 110 that identifies the user identity (i.e., "BobSmith123") of the user who is the owner of the list of digital items displayed in the user interface 100. Typically, the user to whom the user interface 100 is displayed is the user identified in the user indicator 110. The user indicator 110 may display a screen name, a user name, a user identifier, or another type of user indicator to identify the user identity. A user identity also may be referred to as a communication identity. Typically, the user identity is an end-user of the computer network and is not a system administrator of the computer network or a data management system (such as a commercially available relational or object-oriented relational database management system) with authority or capability to create or modify user account information or to enable or disable access by user identities to the computer network or data management system.

The user interface 100 also includes an items window 120 that displays digital items (or indications thereof) 122 and an identity window 130 that displays user indicators 132. By manipulating the user interface 100, a user may indicate that the user identities identified in the identity window 130 are permitted access to digital items and/or notes identified in items window 120, as described more fully below. The user of the user interface 100 may be the owner of the digital items 122. In some implementations, the user of the user interface 100 may be a user other than the owner, such as a user who has been granted permission by the owner of the digital items 122 to access the digital items 122 and also grant permission to other users to access the digital items 122. Indicating that another user may access the item may be referred to as sharing the item with the other user.

More particularly, the items window 120 includes digital items 122 for which the user identified in the user indicator 110 may control which other users may access the digital item and one or more notes that are associated with the digital item. Each of the digital items 122 is identified by an item indicator that shows the name of the digital item (e.g., "ITEM 1" for item 122A).

The item window 120 also includes item check boxes 124 and notes check boxes 126. Each of the digital items 122 has a corresponding item check box and a corresponding notes check box. In one example, the item window 120 includes an item check box 124A and a notes check box 126A for the item 122A (i.e., "ITEM 1"). An item check box enables the user to indicate whether other users may view the corresponding digital item. When an item check box corresponding to a digital item is checked, users identified in the identity window 130 are to be permitted to view the digital item. When an item check box corresponding to an item is not checked, the user identities identified in the identity window 130 are not permitted to view the digital item.

Each of the notes check boxes 126 enables the user interacting with the user interface 100 to indicate whether users identified in identity window 130 are to be permitted to view notes related to the corresponding digital item. When a note check box corresponding to an item is checked, any users identified in the identity window 130 are to be permitted to view a note associated with the item. When a note check box corresponding to an item is not checked, the user identities identified in the identity window 130 are not to be permitted to view the note associated with the item. In some implementations, only users who are permitted to view an item are permitted to view notes associated with the item, although this need not necessarily be so.

The identity window 130 identifies user identities 132 with whom the digital items in item window 120 may be shared. For example, the identity window 130 may present user identities from a friends list or another type of contact list that is associated with the user identified in user indicator 110. The user identities 132 may be a subset or all of the user identities from the friends list. Alternatively or additionally, the user identities 132 may identify users with whom one or more of the digital items 122 have been shared. A user identity of user identifies 132 may be identified by a screen name, a user name, or another type of user identifier. For convenience, each of the user identities 132 may be referred to as a friend, though the user identities 132 need not necessarily have a personal association with the user identified by user indicator 110.

The identity window 130 also includes identity check boxes 134. Each of the user identities 132 has a corresponding identity check box. In one example, the identity window 130 includes an identity check box 134A for the friend 132A (i.e., "USER 1"). The user interface 100 enables a user to identify any, some or all of the friends identified in the identity window 130 to which access to the items and/or notes identified in items window 120 is to be permitted. More particularly, when an identity check box 134 corresponding to a user identity 132 is checked, the user identity is to be permitted to view digital items and notes identified in the items window 120. When an identity check box 134 corresponding to a user identity 132 is not checked, the user identity is not to be permitted to view digital items and notes identified in items window 120. Other implementations may include separate checkboxes that permit separate indications as to whether a particular user identity may access an item and notes associated with the item.

In the example shown in the user interface 100, the items 122A and 122C (i.e., ITEMS 1 and 3), as well as notes that correspond to ITEMS 1 and 3, are to be shared with the users identified in the identity window 130 because the checkboxes 124A, 126A, 124C and 126C are checked. The item 122E (i.e., ITEM 5) is to be shared with the users identified in the identity window 130 and notes associated with ITEM 5 are not to be shared. This is because the item checkbox 124E is checked, whereas the notes checkbox 126E is not checked. The items 122B and 122D (i.e., ITEMS 2 and 4) are not to be shared, nor are notes that correspond to ITEMS 2 and 4 to be shared. This is because check boxes 124B, 124D, 126B and 126E are not checked.

More particularly, in this example, users 132A, 132C and 132E (i.e., USERS 1, 3 and 5) are to be permitted to view items 122A, 122C and 122E (i.e., ITEMS 1, 3 and 5) and are to be permitted to view notes corresponding to items 122A and 122C (i.e., notes corresponding to ITEMS 1 and 3). No user identities are permitted to view items 122B and 122D (i.e., ITEMS 2 or 4) or notes corresponding to items 122B and 122D (i.e., notes corresponding to ITEMS 2 and 4). No user identities are permitted to view notes corresponding to item 122E (i.e. notes corresponding to ITEM 5).

The user interface 100 also includes an all-items control 142 and an all-notes control 144. The all-items control 142 enables a user of interface 100 to indicate that all user identities 132 listed in the identity window 130 are to be able to view all of the digital items 122 listed in the item window 120. In one example, the all-items control 142, when activated, is operable to check (or otherwise activate) all of the identity check boxes 134 and all of the item check boxes 124.

The all-notes control 144 enables a user to indicate that all user identities 132 listed in the identity window 130 are to be able to view notes that correspond to all of the digital items 122 listed in the items window 120. In one example, the all-notes control 144, when activated, is operable to check (or otherwise activate) all of the identity check boxes 134 and all of the notes check boxes 126. In another example, the all-notes control 144, when activated, is operable to check (or otherwise activate) all of the identity check boxes 134, all of the item check boxes 124, and all of the notes check boxes 126.

Each of the all-items control 142 and the all-notes control 144 may help reduce the burden of individually identifying users, items and notes. This may be particularly useful when a user wishes to permit a large number of users to access a large number of items and/or notes.

The user interface 100 also includes a save control 146 operable to persistently store indications of the user identities that are permitted to access digital items and/or notes based on the information indicated in the items window 120 and identity window 130, as described previously, and to remove the user interface 100 from display. An indication of whether a user identity is permitted to access a digital item and/or a note may be referred to as a "permission." For example, the permissions identified may be stored in a database for later use in determining whether a user is permitted to access an item and/or a note related to an item. The user interface 100 also includes a cancel control 148 operable to remove the user interface 100 from display without persistently storing the permissions identified in the user interface 100.

In some implementations, the user interface 100 may include a reset control operable to display the settings in the items window 120 and the identity window 130 based on persistently stored permissions. Stated differently, the user interface 100 may include a reset control operable to modify checkboxes 124, 126 and 134 as necessary to represent persistently stored permissions for the user identities identified in identity window 130. In a more particular example of a reset control, the reset control is operable to set the check boxes 124 and 126 in the items window 120 and the check boxes 134 in the identity window 130 to reflect the stored permissions to the items 122 for the users 132.

As shown, the user interface 100 enables an owner of a digital item or a list of digital items to control access to the digital items and annotations related to the digital items with a high degree of granularity. For example, the owner of multiple digital items can indicate that some of the owner's friends are permitted to view annotations corresponding to particular digital items, while permitting other of the owner's friends to view the particular digital items without viewing the corresponding annotations. For other digital items, the owner can indicate that all of the owner's friends are permitted to view those particular digital items and the annotations associated with those particular digital items.

Figure 2:
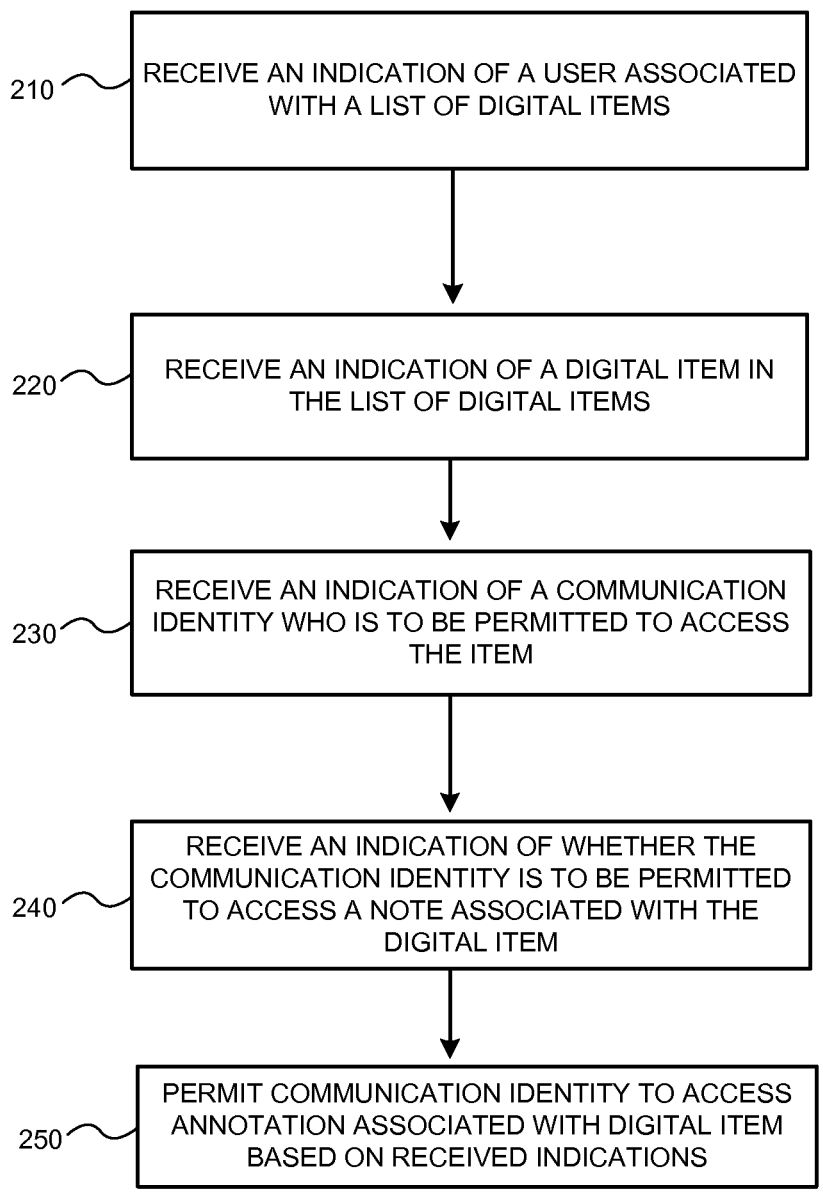
FIG. 2 is a flow chart of a process for indicating whether an annotation associated with a digital item may be shared with another user.

FIG. 2 depicts a process 200 for indicating whether an annotation associated with a digital item may be shared with other users. The process 200 may be performed, for example, by a processor on an instant messaging provider system, a processor on a client system running an instant messaging or chat application, or a processor on a client system executing an on-line dating application.

The process 200 begins when a user initiates display of a user interface to control permissions for other users to access digital items and annotations associated with the digital items. For convenience in describing the example of process 200, the user interacting with the user interface is referred to as the user, whereas the user identity to whom access is to be permitted is referred to as a communication identity. In the example of the process 200, the user is designated as the owner of a list or other type of collection of digital items.

The processor receives an indication of a user who is the owner of a list of digital items that includes an annotation that is to be shared with a communication identity (step 210). This may be accomplished, for example, when the processor receives a user identifier (such as a screen name) that corresponds to the user who initiated the display of the user interface and provides user-input for the process 200. For example, the processor may receive the screen name of the user, where the screen name was identified through a user authentication process performed to grant access to the computer network or to grant access to particular functions available through the computer network (such as an instant messaging, chat or dating application or service). In another example, the user may directly key in or otherwise enter a user identifier using an input device of a computer system.

The processor receives an indication of a digital item in the list of digital items (step 220), an indication of a communication identity who is permitted to access the indicated digital item (step 230), and an indication of whether the communication identity is also permitted to view a note associated with the digital item (step 240). In general, this may be accomplished, for example, when the processor displays a list from which the user selects. In one example, the processor may display a list of digital items from which the user selects a digital item. Once the user selects a digital item, the processor may display a list of communication identities from which the user selects a communication identity. After the user selects a communication identity, the processor may query whether the communication identity is permitted to view the selected item and/or an annotation associated with the selected item.

In another example of the manner in which steps 220-240 may be accomplished, the processor may receive indications based on user-input received from a user interface similar to the user interface 100 of FIG. 1. In a more particular example, the processor may receive an indication of a digital item, such as an identifier identifying a particular digital item (e.g., an identifier that identifies item 122A of FIG. 1) when the check box corresponding to the item indicates a user is to be permitted to view the item (e.g., when check box 124A of FIG. 1 is checked). The processor also may receive an indication of whether a user is to be permitted to view a note related to the item (e.g., an indication of whether the notes check box 126A is checked). The processor may receive an indication of the communication identity, such as a screen name or other type of user identifier, when the corresponding identity check box is checked (e.g., screen name for user 134A is provided when identity check box 134A is checked).

After receiving indications of a digital item, a communication identity and whether the communication identity is permitted to access an annotation that is associated with the indicated digital item, the processor permits the indicated communication identity to access the annotation related to the indicated digital item conditioned on receiving an indication that the communication identity is permitted to access the annotation (step 250). This may be accomplished, for example, by persistently storing in a data structure an indication of permission for the communication identity to view an annotation associated with the indicated digital item. For example, a data structure may associate the indication of the communication identity, the indication of the digital item (such as an identifier for a particular digital item), and an indication that the communication identity is permitted to view a note or notes associated with the digital item. In some implementations, the permission may be granted only for the current communication session, and, if so, the permission may be transiently stored in lieu of being persistently stored.

In some implementations, the processor also may receive and store an indication of delegation of authority to the communication identity to permit the communication identity, in turn, to enable other communication identities access to the digital item and/or notes associated with the item. The delegation may be later used to permit the user to enable other users to access the digital item and/or annotations associated with the digital item.

The process 200, or portions thereof, may be used to permit multiple communication identities access to an annotation associated with a digital item. The process 200, or portions thereof, also may be used to permit a communication identity access to multiple annotations where an annotation is associated with a digital item.

Figure 3:
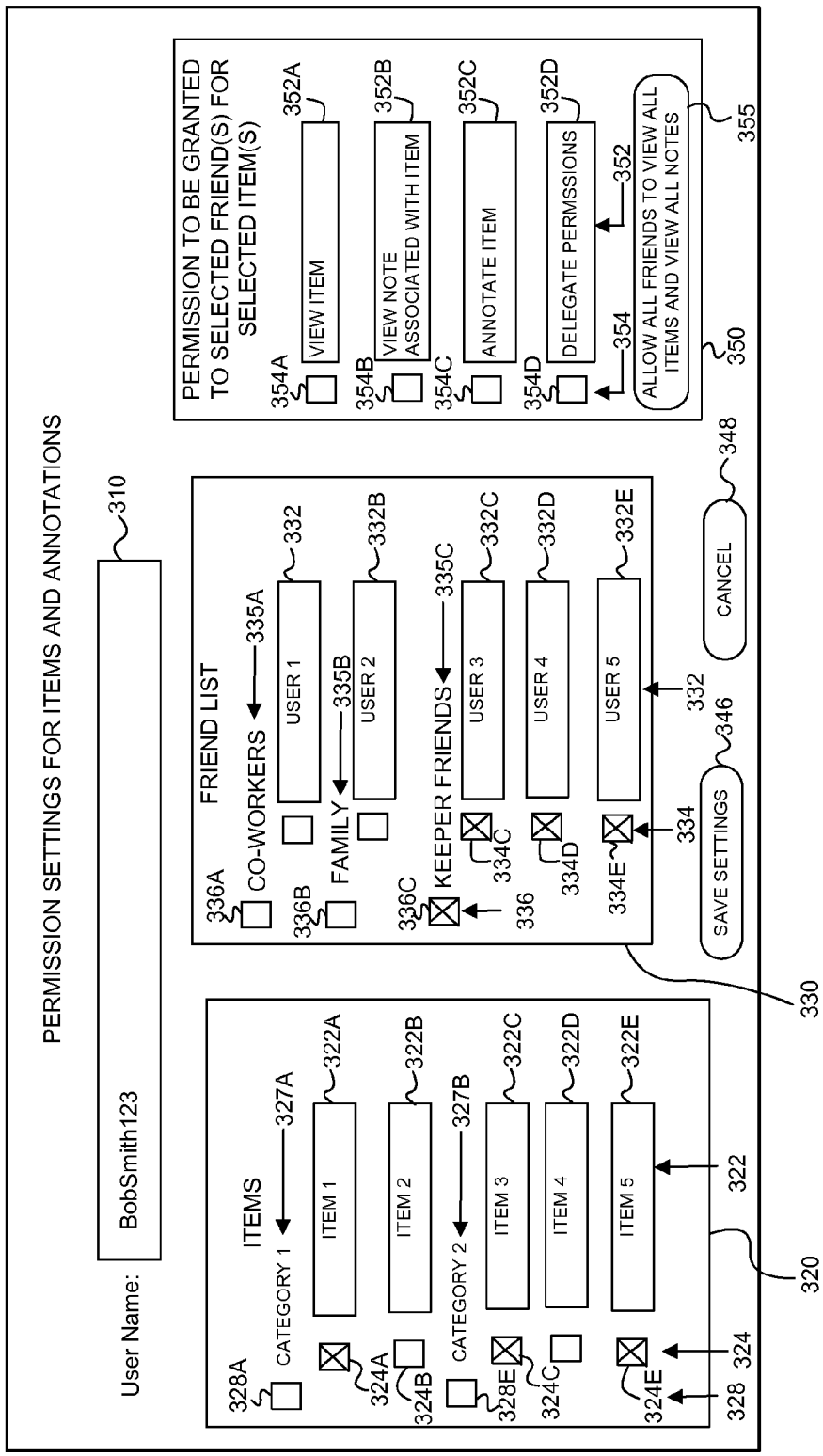

FIG. 3 depicts another exemplary graphical user interface 300 for setting permissions to control the sharing of one or more digital items and user-entered notes related to the digital items with other users. In contrast to the user interface 100 of FIG. 1, the user interface 300 enables a user to indicate whether communication identities may create notes for the items in the list and to delegate authority to communication identities to allow still other communication identities to view and/or annotate the shared items. In general, the user indicates which items to share and with whom to share the items using the controls in items window 320 and identity window 330, respectively. The user indicates how the indicated items are be shared with the indicated users by selecting controls in permissions settings window 350.

The user interface 300 includes a user indicator 310 that identifies the user identity of the owner of the digital items for which permissions are to be set. The user indicator 310 may be an implementation of the user indicator 110 of FIG. 1.

The user interface 300 also includes the items window 320 that displays digital items 322 and item check boxes 324 for each of the digital items 322. In contrast with the example shown in interface 100, the items 322 are grouped into one or more user-defined or pre-selected groups or categories 327A and 327B (collectively, "categories"). As shown, items 322A and 322B are grouped into category 327A (i.e., CATEGORY 1), and items 322C-322E are grouped into category 327B (i.e., CATEGORY 2).

The items window 320 also includes category-selector check boxes 328. The user may indicate that all of the digital items within a category are to be shared by selecting the category-selector check box corresponding to the category. For example, an indication that items 322A and 322B are to be shared may be made by checking (or otherwise activating) category-selector check box 328A, which corresponds to the category 327A. In some implementations, checking category-selector check box 328A may cause item check boxes 324A and 324B to appear checked or otherwise selected, though this may not necessarily be so.

Alternatively or additionally, the user may select or de-select individual items by selecting or de-selecting an item checkbox of checkboxes 324, which corresponds to the item to be selected or de-selected. The ability to select all items in a category and de-select previously selected individual items may be useful, for example, when a user desires to share many (but not all) of a large number of items in a category.

The user interface 300 also includes an identity window 330. In contrast to the identity window 130 of FIG. 1, friends 332 are grouped into one or more user-defined or pre-selected groups or categories ("groups") within the friends window 330. As shown, the identity window 330 has three groups, Co-workers 335A, Family 335B and Keeper Friends 335C. User 332A belongs to the Co-workers group 335A, user 332B belongs to the Family group 335B, and users 332C-332E belong to the Keeper Friends group 335C. All friends in a group may be selected by checking (or otherwise activating) a group-identity checkbox 336A, 336B or 336C that corresponds to the group of friends to be permitted access. To individually indicate a friend with whom to share the digital items selected in item window 320, a user selects the identity check box 334 that corresponds to a friend to be selected. In the example shown in user interface 300, the group-identity check box 336C is checked, which results in each of the identity check boxes 334C-334E being checked. The identity check boxes 334C-334E correspond to the friends 332C-332E, respectively.

The user interface 300 also includes the permissions setting window 350. The user may indicate permissions settings for the items selected in item box 320 to be provided to the friends selected in an identity s window 330. The permission settings window 350 includes controls 354 to indicate that the friends are, for example, permitted to perform actions 352 for the items identified in the items window 322.

More particularly, a user is able to indicate that friends identified in identity window 330 are able to view the items identified in item window 320 by selecting check box 354A for permission setting 352A (i.e., view item). The user is able to indicate that friends identified in the identity window 330 are able to view a note or notes related to the items identified in item window 320 by selecting check box 354B for permission setting 352B (i.e., view note associated with item). The user is able to indicate that friends identified in the identity window 330 are able to annotate the items identified in item window 320 by selecting check box 354C for permission setting 352C (i.e., annotate item). The user is able to indicate that friends identified in the identity window 330 are able to delegate permissions for the items identified in item window 320 by selecting check box 354D for permission setting 352D (i.e., delegate permissions).

In some implementations, one or more combinations of permissions may not be permitted. For example, in some implementations, a user may be required to be permitted to view a note associated with an item (permission 352B) in order to be able to annotate the item (permission 352C). In another example, a user may be permitted to delegate authority only of the same type of authority that the user has. For example, the user may be permitted to delegate viewing annotations for a digital item only when the user is permitted to view the annotations for a digital item—that is, the user may not be able to delegate viewing annotations for a digital item when the user is not permitted to view annotations for the digital item.

Once the user owner has indicated which permissions, if any to grant, by selecting one or more of check boxes 354A-354D, the user may grant the particular permissions indicated by permissions setting window 350 to the friends selected in identity window 330 for the items selected in the items box 320 by activating (such as by using a pointing device to click) the save settings control 346. The user interface 300 may be removed from display without granting any permissions by activating the cancel control 348. Alternatively, the user may allow all of the users in identities window 330 to view all of the items in the digital list shown in the items box 320 and any associated notes by activating the all-friends control 355.

In some implementations, a user interface for setting permissions may include multiple windows, such as where windows are serially presented. For example, when a user selects an item or a category presented in a window, the friends list is presented in another window (such as a pop-up window), and when a user is selected from the friends list, a list of permissions is presented in yet another window.

Figure 4:
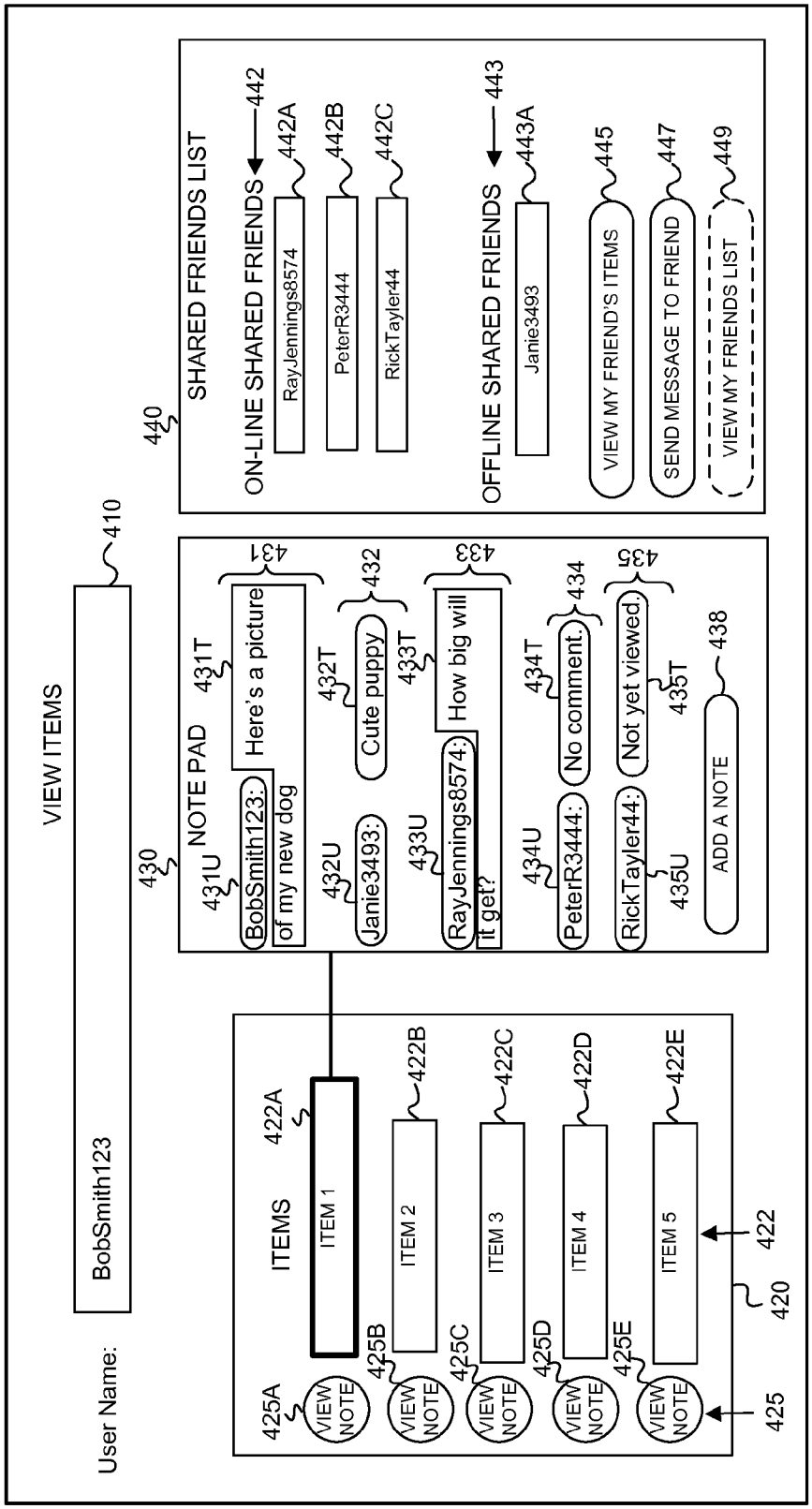
FIG. 4 is a diagram of an exemplary user interface for presenting digital items, annotations related to the digital items, and indications as to whether users who are permitted to access a digital item are on-line.

FIG. 4 shows an exemplary user interface 400 for enabling an owner of a list of digital items to view the notes that other users have made for the digital items. The user interface 400 also allows the user to view which friends with whom an item has been shared, is being shared, or may be shared are currently on-line, and which friends are currently off-line. The owner of the item' may also use the user interface 400 to annotate (or add notes) corresponding to digital items. Other users may be allowed to view and/or create annotations of items in the owner's list once the owner gives the other user permission to view, and/or make annotations to the item, respectively.

The user interface 400 includes a user indicator 410 that displays the user identity of the owner of the digital items. The items window 420 displays the digital items. As shown in this example, the digital item itself is able to be displayed in the item window 422. Alternatively or additionally, an item identifier or indicator may be displayed in the item window 422 and, upon activation of the item identifier or indicator, the item itself is displayed and/or started (such as by playing an audio segment or playing a video segment). In some instances, a portion of a digital item may be displayed in item window 422, and another portion of the digital item may be displayed outside of window 422 or started based on user-initiated action or occurrence of a pre-determined condition (such as when the portion of the digital item displayed in item window 422 is selected by a pointing device or after a predetermined period of time has passed).

The items window 420 also includes a view-note control for each item. In this example, 425A, 425B, 425C, 425D or 425E are the view-note controls for the items in the items box 420. When one of the view-note controls is activated or selected, the note pad 430 shows notes associated with the corresponding one of items 422A-422E. In the example shown in the user interface 400, the view-note control 425A is activated and the notes associated with item 422A are displayed in the note pad 430.

The note pad 430 includes user-entered notes 431-433. Each of notes 431-433 includes a portion that identifies the user identifier for the user who entered the note and a portion that identifies the annotation itself (here, the annotation is a textual note). This or other implementations may support other types of data in annotations, such as graphic images, photographs, audio segments, and/or video segments. More particularly, note 431 includes a user identifier 431U and an annotation 431T; note 432 includes a user identifier 432U and an annotation 432T; and note 433 includes a user identifier 433U and an annotation 433T. The users identified by user identifier 432U and 433U each are permitted to enter annotations for item 422A.

The note pad 430 also indicates whether users with permission to view and/or annotate the item have viewed and/or annotated the item, as shown by programmatically generated notes 434 and 435. In this example, permitted-user "PeterR3444" (identified by the user identifier 434U) has viewed but has not commented on item 422A, as indicated by 434T (i.e., "No comment."). Permitted-user "RickTayler44" (identified by the user identifier 435U) has not viewed or commented on item 422A, as indicated by 435T (i.e., "Not yet viewed."). The note pad 430 also includes a control 438 that allows the user of interface 400 to add a note about the item selected in the item window 420.

The exemplary user interface 400 also includes a shared-friends window 440. The shared-friends window 440 displays the user identifiers 442A, 442B, 442C and 443A of friends with whom the item selected in item window 420 has been shared or is being shared. The shared-friends window 440 indicates whether each of the friends is on-line or off-line.

More particularly, the shared-friends window 440 includes an on-line group 442 and an off-line group 443. The on-line group 442 includes friends 442A, 442B and 442C, all of whom are currently on-line, whereas the off-line group 443 includes friend 443A, who is not currently on-line. In another example of indicating whether a friend with whom an item has been shared is on-line or off-line, an icon may be shown adjacent to the friend's user identifier to indicate whether the friend is on-line or off-line. In yet another example, only on-line friends may be listed in a shared-friends window 440.

The ability to see what friends with whom an item has been or is being shared are on-line may be desirable. For example, the user may desire to start a dialogue with one of the friends with whom the item has been shared and may be able to initiate communications more conveniently when presence information about the friend's online status is available.

The shared-friends window 440 also includes a control 445 (i.e., VIEW MY FRIEND'S ITEMS) that is operable to enable a user to view the items that have been shared by a friend with the user. This may be accomplished, for example, by augmenting the item window 422 to include items that are owned by a friend of the user (rather than owned by the user) and have been shared with the user (e.g., the augmented items are presented in the item window 420 in addition to the items 422A-422E owned by the user). In another example, the item window 422 may include only items that have been shared with the user (e.g., the items 422A-422E are replaced by the items shared with the user).

The shared-friends window 440 also includes a control 447 operable to enable a user to send a message to one of the friends who is on-line. This may be accomplished, for example, by displaying an instant message communication interface that enables a user to send an instant message.

Figure 4A:
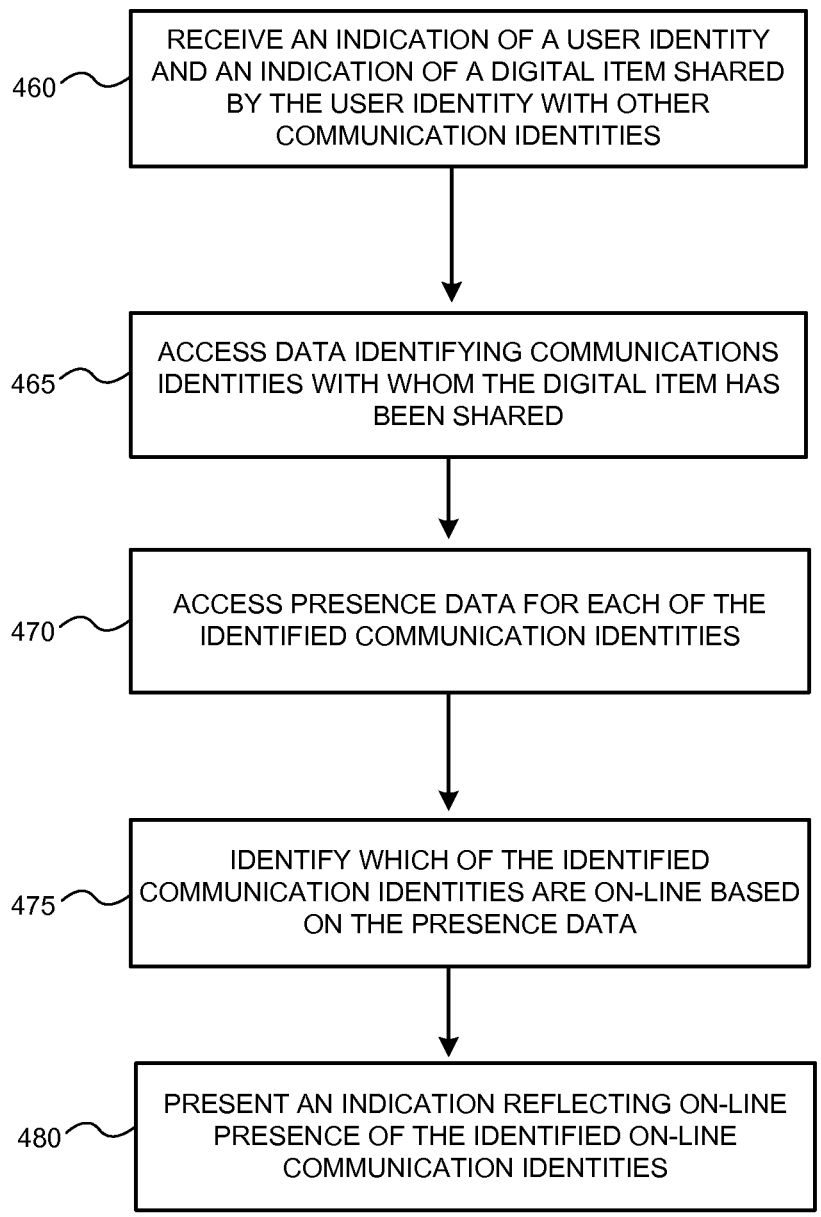
FIG. 4A is a flow chart of a process for determining whether a user with whom a digital item has been shared is on-line.

FIG. 4A is an illustration of a process 400A for determining whether a user with whom a digital item has been shared is on-line. The process 400 may be performed, for example, by a processor on an instant messaging provider system or a processor on a client system running an instant messaging or chat application.

The process 400A begins when the processor receives an indication of a user identity and an indication of a digital item that has been shared by the user identity with other communication identities (step 460). The processor accesses data identifying communications identities with whom the digital item has been shared (step 465). For example, the process may access permission information in a data structure that associates a digital item and communication identities that are permitted to access the digital item.

The processor accesses presence data for each of the identified communication identities (step 470). For example, a data structure may include data identifying which communication identities are on-line (e.g., signed in or logged on) to the instant messaging system.

The processor identifies which of the identified communication identities are on-line based on the presence data (step 475). This may be accomplished, for example, by searching the presence data for identifiers that correspond to the communication identities identified in step 465.

The processor presents an indication reflecting on-line presence of the identified on-line communication identities (step 480). In one example, a friends list of the friends with whom the digital item has been shared may present friends that are on-line in one group and friends that are off-line in another group, as described previously. In another example, an icon indicating on-line presence may be displayed adjacent to an identifier of an on-line communications identity in a friends list.

FIGS. 5-8 show exemplary user interfaces 500-800 for enabling a user to permit another user access to a digital item and annotations related to the digital item in the context of an on-line dating application. In general, the user interfaces 500-800 enable a user to electronically search for potential dating prospects, to select a subset of the identified dating prospects as candidate dating prospects (which may be referred to as "keepers"), to share with friends some or all of the candidate dating prospects (or keepers) along with comments about the candidate dating prospects, and to view a friend's candidate dating prospects.

Figure 5:
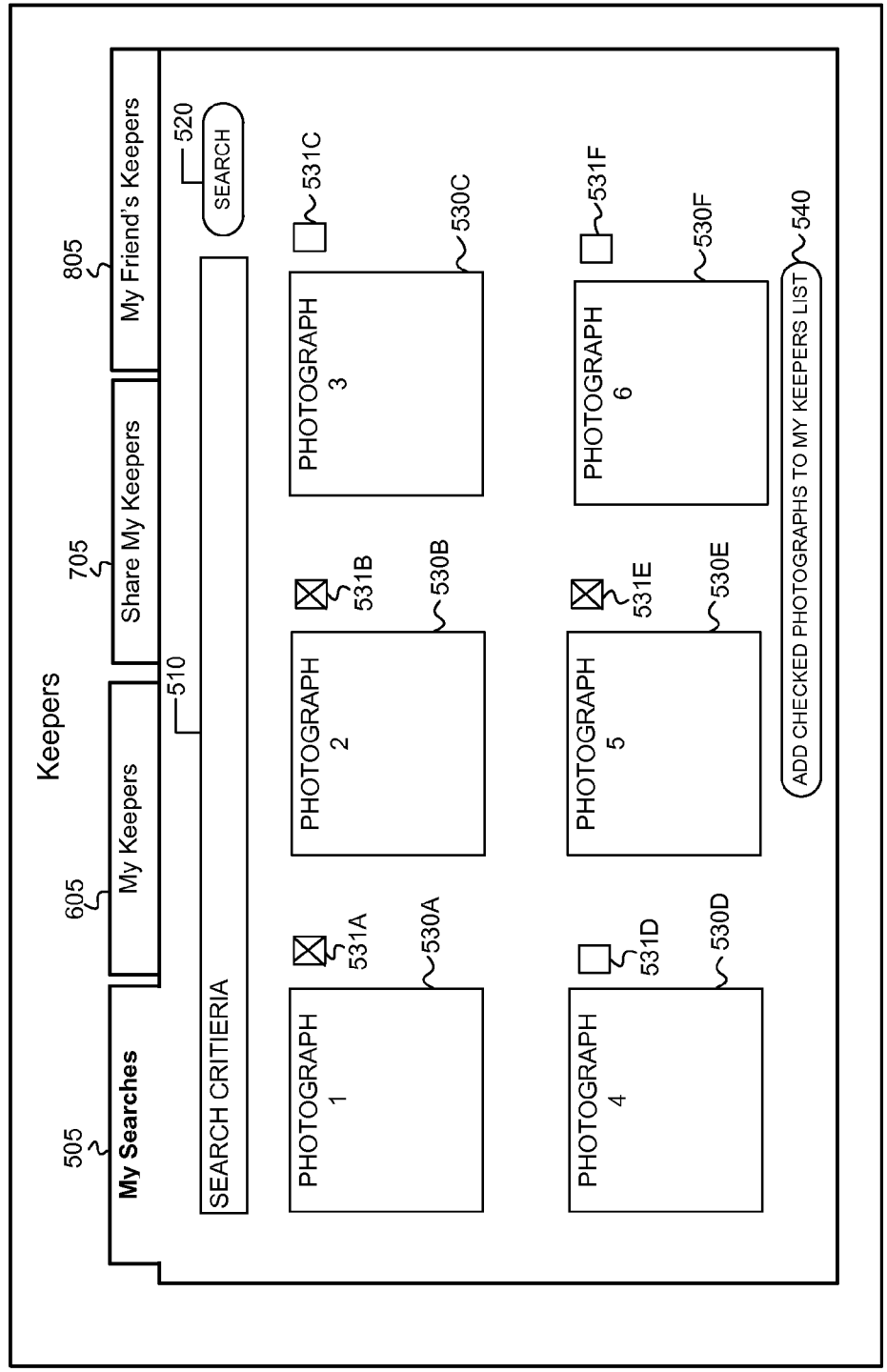
FIGS. 5-8 are diagrams of exemplary user interfaces for enabling a user to permit another user access to a digital item and annotations related to the digital item in the context of an on-line dating application.

Referring to FIG. 5, an exemplary user interface 500 is shown that allows a user to search digital profiles of potential dating prospects. The user interface 500 includes interface tabs 505, 605, 705 and 805 that enable a user to select which of the user interfaces 500-800 are displayed, respectively. As shown, interface tab 505 is activated.

The user interface 500 includes search criteria selector 510 that allows the user to search for profiles with particular attributes. For example, in the context of on-line dating, the search criteria 510 may include criteria such as gender, age, and zip code or another type of location indicator. The search button 520 allows the user of interface 500 to initiate a search the profiles in the database using the search criteria entered in search criteria selector 510.

The user interface 500 displays the result of the user's search with a photograph 530A-530F of each potential dating prospect that matches the entered search criteria 510.

Each resulting photograph 530A-530F has an associated check box 531A-531F so that the user may select any of photographs 530A-530F as a candidate dating prospect (e.g., a keeper).

The control 540 is operable to associate the selected photographs 530A-530F and any corresponding profiles with the user identity manipulating the user interface 500. In the example shown in the user interface 500, the user has selected photograph 530A (i.e., photograph 1), photograph 530B (i.e., photograph 2), and photograph 5 (i.e., photograph 5) to add to user's "My Keepers" list. Activating control 540 adds the selected photographs to the user's "My Keepers" list.

Figure 6:
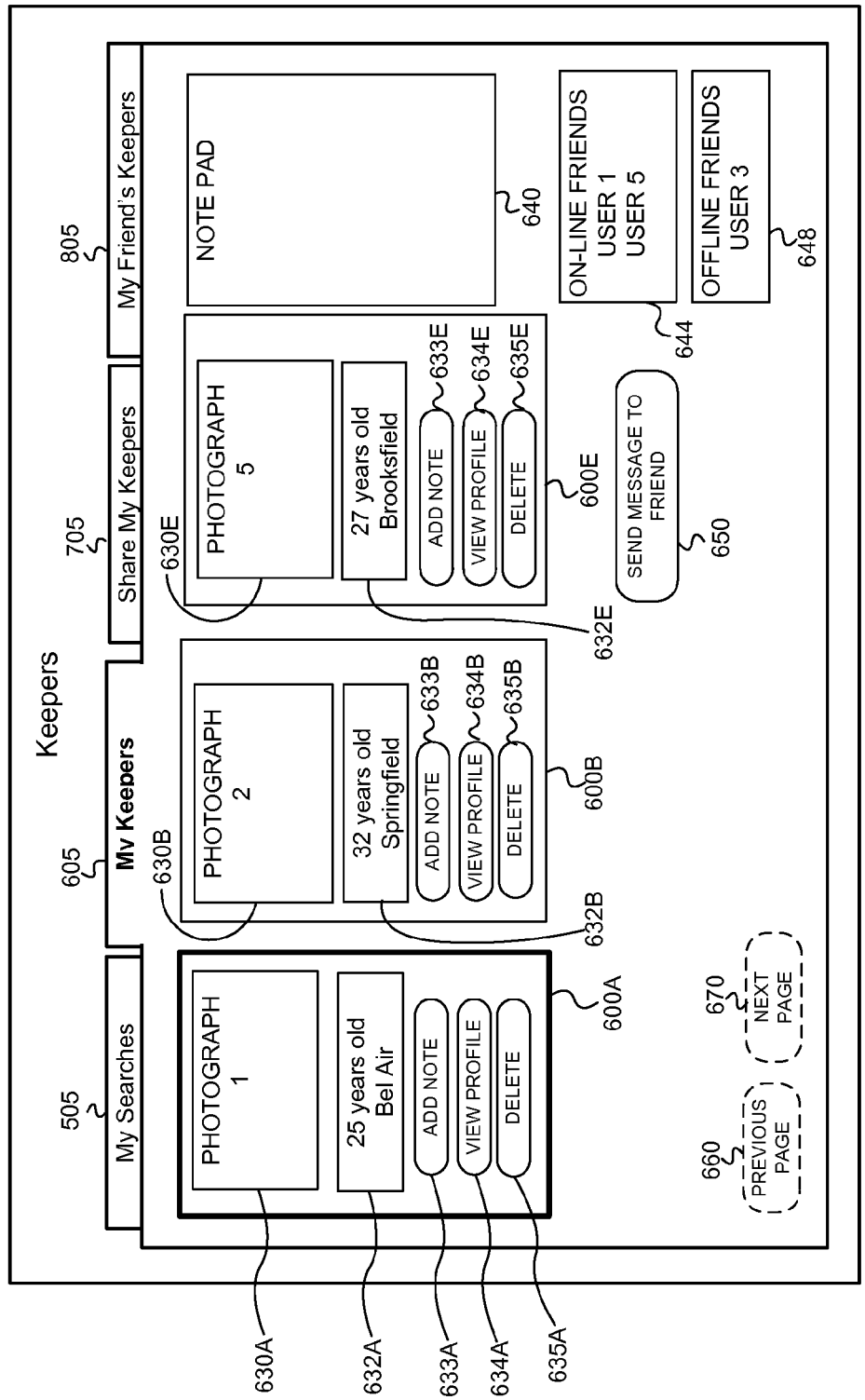

FIG. 6 shows an exemplary interface 600 that enables the user to view the items in the user's "My Keepers" list. This example is a continuation of the example shown in FIG. 5, in which the user selected photographs 530A, 530B and 530E to be added to the user's "My Keepers" list. Similarly to the user interface 500 of FIG. 5, the user interface 600 includes interface tabs 505, 605, 705 and 805 that enable a user to select which of the user interfaces 500-800 are displayed, respectively. As shown, interface tab 605 is activated.

The user interface 600 shows keepers 600A, 600B and 600E, each of which correspond to one of the selected photographs 530A, 530B and 530E of FIG. 5. Each of the keepers 600A, 600B and 600E includes a corresponding photograph 630A, 630B or 630E and a corresponding summary 632A, 632B or 632E. In this example, the summary includes textual information presented for a keeper including the dating prospect's age and the city in which the dating prospect lives or works. Other textual information from the profile for the dating prospect also may be presented.

Each of keepers 600A, 600B and 600E also includes a control 633A, 633B or 633E to add a note about the keeper, a control 634A, 634B or 634E to view more profile information about the keeper, and a control 635A, 635B or 634E to delete the keeper from the user's "My Keepers" list.

The user interface 600 also includes a note pad 640 that displays notes about a keeper. In this example, the keeper 600A is selected as shown by the thicker lines for the border for keeper 600A relative to the thickness of the lines for the borders for keepers 600B and 600E. The note pad 640 displays notes entered about the selected keeper. The note pad 640 may be an implementation of note pad 430 of FIG. 4.

The user interface 600 includes an on-line friends window 630, which identifies which of the user's friends are currently on-line, and an offline friends window 648, which identifies which of the user's friends are currently offline. The user may send an instant message to a friend who is currently on-line by activating the send message control 650.

If the user's "My Keepers" list contains too many items to display on the user interface 600 at one time, the user may scroll through the user's keepers using the previous page control 660 and the next page control 670.

Figure 7:
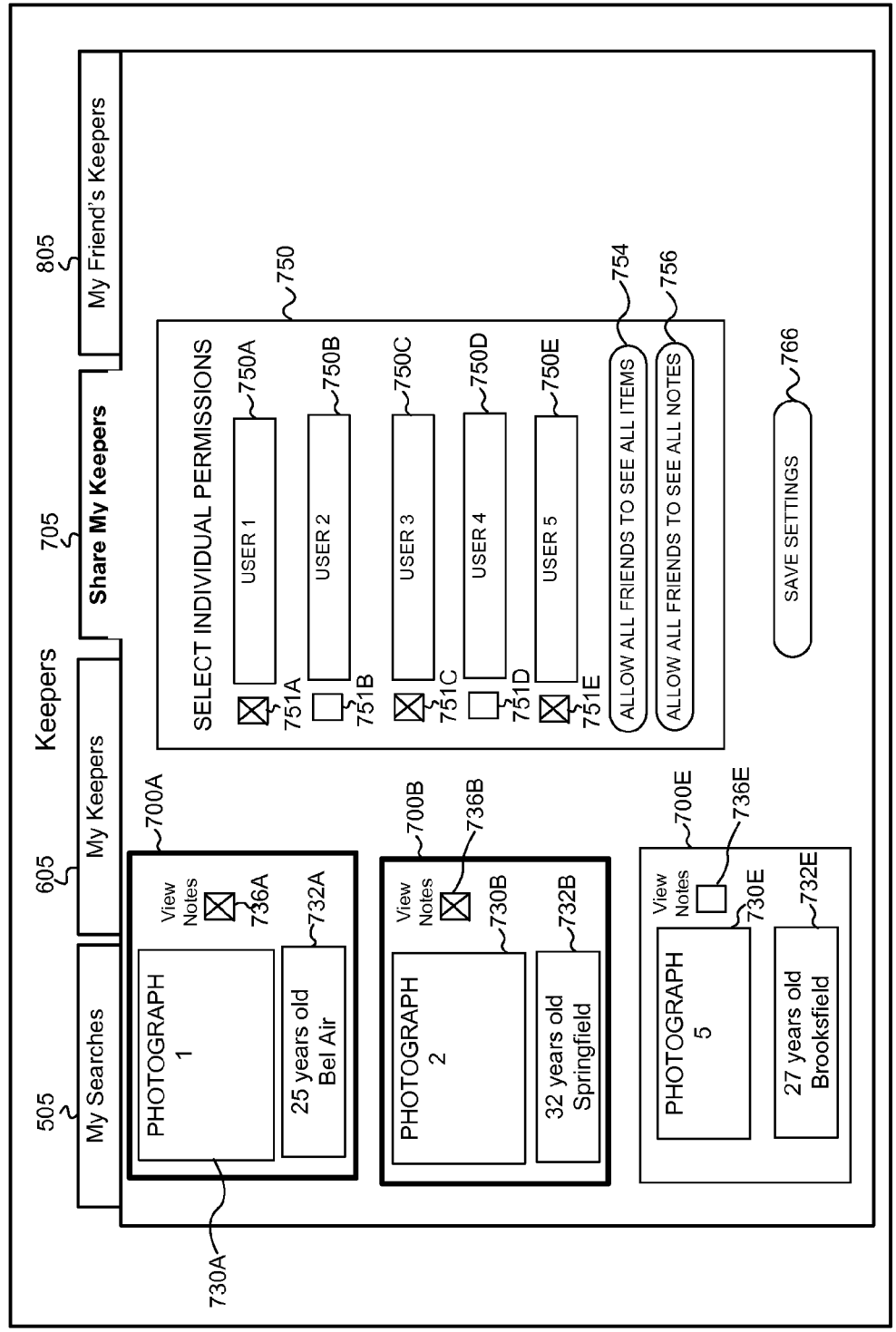

Referring also to FIG. 7, an exemplary user interface 700 allows the user to select items in his or her "My Keepers" list to share with other users. The user interface 700 allows the user to indicate which items in the list, if any, are shared with other users and whether the notes associated with the items are also shared. Similarly to the user interfaces 500 of FIG. 5 and 600 of FIG. 6, the user interface 700 includes interface tabs 505, 605, 705 and 805 that enable a user to select which of the user interfaces 500-800 are displayed, respectively. As shown, interface tab 705 is activated.

The user interface 700 includes a display window 700A, 700B and 700C for each item in the user's "My Keepers" list. In the context of on-line dating, each display window 700A, 700B or 700C includes a photograph 730A, 730B or 730E and summary 732A, 732B or 732E of the profile associated with the photograph 730A, 730B or 730E. Each display window 700A, 700B or 700C also includes a notes check box 736A, 736B or 736E to indicate that a user identified in the identity window 750 is permitted to view notes associated with the keeper 700A, 700B or 700C.

The user interface 700 also includes identity window 750 that enables the user to share the user's "My Keepers" list with any of the user's friends (other users) listed in identity window 750. Each friend 750A-750E shown in the identity window 750 has a corresponding identity check box 751A-751E. To share an item in the "My Keepers" list with particular friends in the identity window 750, the owner of the "My Keepers" list selects the check box 751A-751E corresponding to the particular friends and selects the keepers that are to be shared.

The owner selects the items in the list to share by highlighting the items' display box 700A, 700B or 700E. In this example, the owner of the "My Keepers" list has indicated that the keepers 700A and 700B (which are highlighted relative to display window 700E, as shown by the relative thickness of the border line around each display window) are to be shared with users 750A, 750B and 750E. The notes associated with each of the keepers 700A and 700B are to be shared, as shown by the note check boxes 736A and 736B being checked. In this example, the user has indicated that friends 750A, 750C and 750E are permitted to access keepers 700A and 700B and notes associated with each of the keepers 700A and 700B.

Alternatively, the owner can share all items in his or her "My Keepers" list with all of the friends shown in identity window 750 by activating control 754. The owner may share all of the notes associated with the selected items in the user's "My Keepers" list by activating control 756. The user interface also includes control 766 to persistently store the permissions settings, as described previously.

Figure 8:
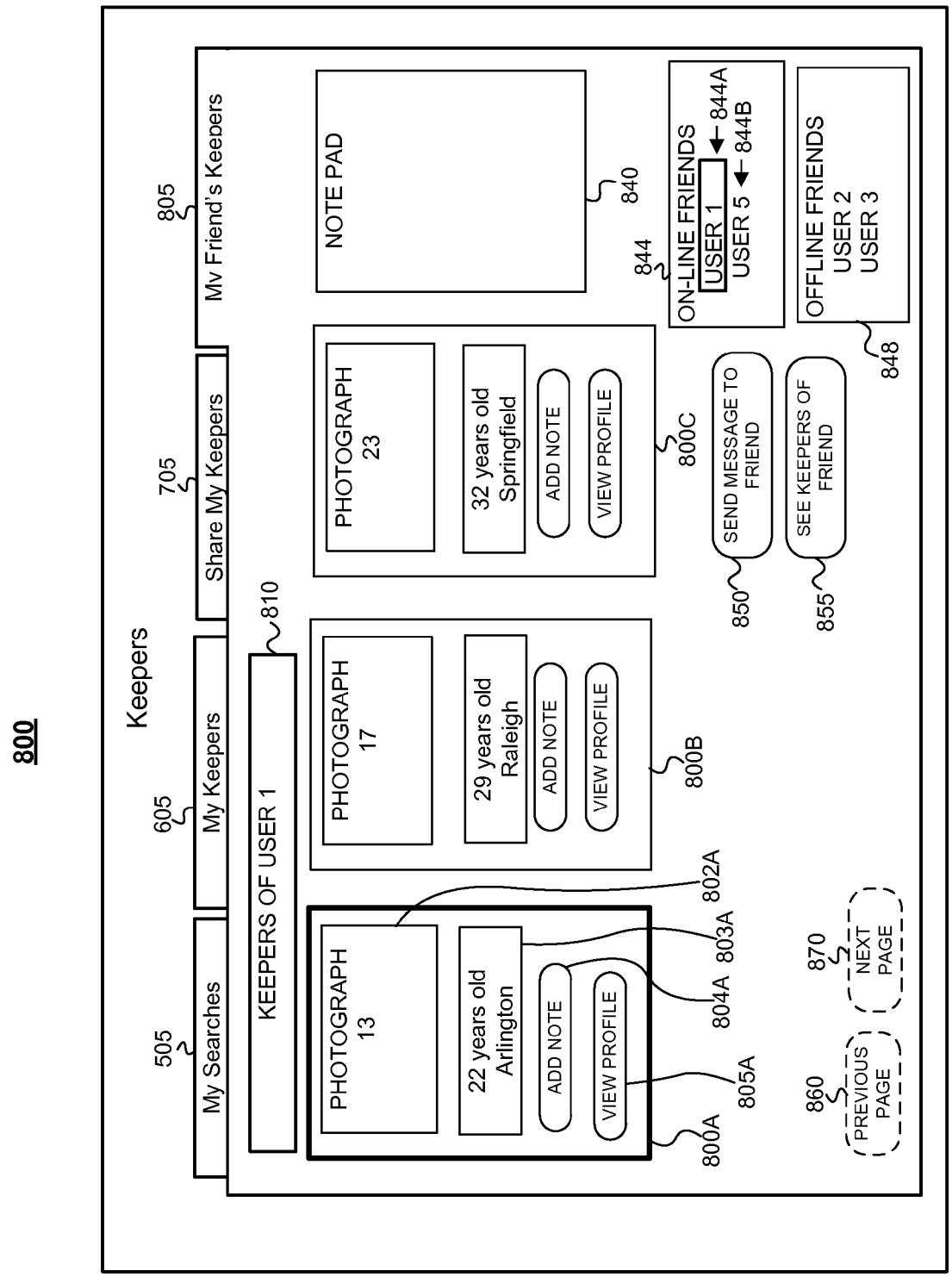

Referring also to FIG. 8, the exemplary user interface 800 displays the keepers of one of the user's friends. The user interface 800 includes interface tabs 505, 605, 705 and 805 that enable a user to select which of the user interfaces 500-800 are displayed, respectively. As shown, interface tab 805 is activated.

The user interface 800 displays an indication 810 of the user identity of the friend whose keepers are being displayed in the interface 800. The user interface 800 also includes keepers 800A, 800B and 800C that are associated with the user identity identified in indication 810.

Similar to keepers 600A, 600B and 600E of FIG. 6, each of the keepers 800A, 800B, and 800C includes a photograph, a summary, an add-note control, and a view-profile control. For example, the keeper 800A includes a photograph 802A, a summary 803A, an add-note control 804A and a view-profile control 805A. In some implementations, an add-note control is only displayed when the user to whom the interface is displayed is permitted to add annotations to a keeper.

The user interface 800 also includes a note pad 840 that displays notes for a selected keeper. As shown, the keeper 800A is selected (as shown by the thickness of the window border of keeper 800A relative to the thickness of the window borders of keepers 800B and 800C) and notes presented in the note pad 840 relate to the selected keeper 800A.

The user interface 800 also indicates whether the user's friends (other users that the user of interface 800 has shared items with) are currently on-line. To do so, the user interface 800 includes an on-line friends window 844 and an offline friends window 848. The send-message control 850 is operable to display an instant messaging user interface that enables the user to compose and send a message to one of the on-line friends by identifying the user identity in the on-line friend window 844. As shown, friend 844A is selected.

The user interface also includes a see-keepers-of-friend control 855 operable to enable the user to view the keepers of the friend selected in the on-line friends window 844 or the offline friends window 848 (here, friend 844A). In the example shown in interface 800, friends 844A (i.e., "user 1") and 844B (i.e., "user 5") are currently on-line and the user has selected friend 844A (i.e., "user 1") in friends on-line window 844. Because friend 844A is on-line and selected, the user of interface 800 could send a message to friend 844A in addition to viewing the keepers of friend 844A, which are already displayed on interface 800.

If the friend's "My Keepers" list contains too many items to display on interface 800, the user may scroll through the keepers on the friend's list with the previous page control 860 and the next page control 870.

Figure 9:
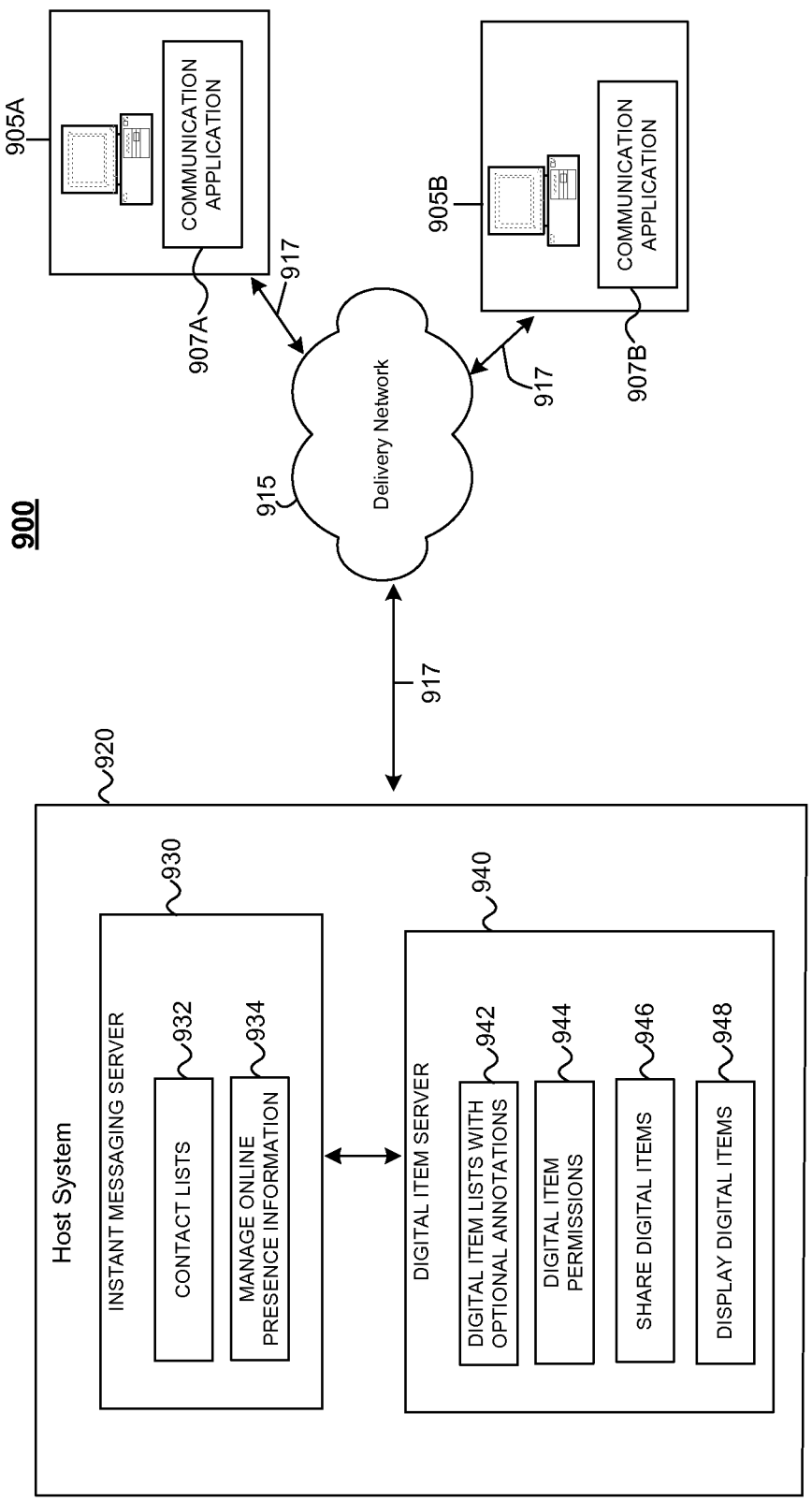
FIGS. 9 and 10 are block diagrams of systems capable of allowing sharing of digital items and annotations related to the digital items.

FIG. 9 shows a communications system 900 that is capable of allowing sharing of digital items and annotations related to the digital items. The communications system 900 is capable of providing access to digital items and annotations to each of client systems 905A and 905B. A host system 920 and a network 915 are used to facilitate the access to such digital content.

More particularly, users of the communications system 900 are distributed geographically and use client systems 905A and 905B to access digital items and annotations stored on host system 920. The client systems 905A and 905B are shown as including, respectively, communication applications 907A and 907B. The network 915 interconnects the client systems 905A and 905B. The client systems 905A and 905B are connected to network 915 through various communication paths 917, such as a modem connected to a telephone line using, for example, serial line internet protocol (SLIP) or point-to-point protocol (PPP) or a direct network connection using, for example, transmission control protocol/internet protocol (TCP/IP). The host 920 also is connected to the network 915 over communication pathway 917 and is used to facilitate some direct or indirect communications between the host system 920 and client systems 905A and 905B.

Each of the client systems 905A and 905B may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. The client systems 905A and 905B may receive instructions from, for example, a software application, a program, a piece of code, a device, a computer, a computer system, or a combination thereof, which independently or collectively direct operations, as described herein.

The client systems 905A and 905B include communications applications 907A and 907B having instructions to facilitate communications between the host system 920 and the client systems 905A and 905B. For instance, such communications applications may include e-mail programs, instant message programs, file transfer protocol (FTP) programs, and voice over internet protocol (VoIP) programs. Another example of a communications application is a web browser or an application-specific program for communicating with the host system 920. The instructions may be embodied permanently or temporarily in any type of machine, component, equipment, storage medium, or propagated signal that is capable of being delivered to the client systems 905A and 905B for execution.

The communication applications 907A or 907B also may include contact lists that include communications identities ("friends") with which messages are exchanged using the respective client systems 905A and 905B. For example, the messages exchanged may be instant messages, electronic mail (e-mail) messages, text messages or audio messages, including voice messages.

More particularly when the communication applications 907A or 907B are instant message applications, the instant message applications 907A and 907B include a contact list for each user that uses the client systems 905A and 905B to send and receive instant messages. The contact list also may be referred to as a participant list or a friend list. The instant message applications 907A and 907B enable the users to send and receive instant messages with the client systems 905A and 905B. Instant messages are sent between users of the client systems 905A and 905B through an instant message server 930 on the host system 920. In one example, a contact list may be a BuddyList® of AOL Instant Messager® available from America On-line, Inc. of Dulles, Va.

The client systems 905A and 905B include a communications interface (not shown) used by the communications programs to send communications through network 915. The communications may include e-mail, audio data, video data, general binary data, or text data (e.g., encoded in American Standard Code for Information Interchange (ASCII) format). Client systems also include one or more input devices, such as a keyboard, a mouse, a stylus, or a microphone, as well as one or more output devices, such as a monitor, a touch screen, speakers, or a printer.

The network 915 typically includes a series of portals interconnected through a coherent system. Examples of the network 915 include the Internet, Wide Area Networks (WANs), Local Area Networks (LANs), analog or digital wired and wireless telephone networks (e.g., a Public Switched Telephone Network (PSTN), an Integrated Services Digital Network (ISDN), or a Digital Subscriber Line of various types (DSL)), or any other wired or wireless network. The network 915 may include multiple networks or subnetworks, each of which may include, for example, a wired or wireless data pathway.

As with the client systems 905A and 905B, the host system 920 may be implemented using, for example, a general-purpose computer capable of responding to and executing instructions in a defined manner, a special-purpose computer, a workstation, a server, a device, a component, or other equipment or some combination thereof capable of responding to and executing instructions. The host system 920 may receive instructions from, for example, a software application, a program, a piece of code, a device, a computer, a computer system, or a combination thereof, which independently or collectively direct operations, as described herein. These instructions may take the form of one or more communications programs. Such communications programs may include, for example, e-mail programs, instant message programs, FTP programs, and VoIP programs. The instructions may be embodied permanently or temporarily in any type of machine, component, equipment, storage medium, or propagated signal that is capable of being delivered to the host system 920.

Further, the host system 920 includes a communications interface (not shown) used by the communications programs to send communications through network 915. The communications may include e-mail, audio data, video data, general binary data, or text data (e.g., encoded in American Standard Code for Information Interchange (ASCII) format).

The host system 920 includes an instant messaging server 930 that operates instant messaging server software configured to process communications sent from and received by users of an instant messaging service. In particular, the instant messaging server 930 is configured to exchange instant messages and communications related to the instant message service between the client systems 905A and 905B and the provider system 920 over the network 915. The instant message server 930 may initiate a point-to-point connection with the client systems 905A and 905B, and/or may route instant messages sent with the communication applications 907A and 907B.

The instant messaging server 930 includes contact lists 932 that are associated with instant messaging user accounts (e.g., a screen name or other type of instant message identity identifier). The people listed in the contact lists 932 may be referred to as contacts or friends. Each contact information entry in the contact list 932 may identify a screen name (or other type of instant message address or identity identifier) for a contact of the instant message identity to whom the contact list 932 applies (e.g., sender). In some implementations, the address book may include additional information, such as a name, mailing address information, and telephone numbers. Some implementations may refer to a contact list by other terms, such as address book or user information.

The instant messaging server 930 also includes code segments 934 to manage on-line presence information. The code segments 934 indicate to the instant message server whether the users listed in contact list 932 are on-line (e.g., signed in to the instant message service). The code segments 934 also indicate whether the users in contact list are offline (e.g., not signed in to the instant messaging service).

The host system 920 also includes a digital item server 940, which enables a user of the instant messaging application 905A or 905B to share digital items that are in a list that the user owns. The digital item server 940 stores the user's lists of digital items along with any annotations (or notes) associated with the items in storage area 942. The storage area 942 may be implemented using a database, though a database need not necessarily be used.

The digital item server 940 also maintains a data store 944 for permissions associated with digital items and annotations related to digital items. When another user requests access to a digital item or a note related to a digital item, the digital item server 940 uses data store 944 to determine whether the user has permission to access the digital item or note.

The digital item server 940 also includes code segments 946 that, when executed, enable an owner of a digital item to indicate that one or more other users are permitted to access the digital item or notes related to the digital item. For example, the code segments 946 may implement a process similar to process 200 of FIG. 2 or may display a user interface similar to, or including aspects of, one of the user interfaces 100, 300 or 700 of FIG. 1, 3 or 7, respectively.

The digital item server 940 may execute code segments 948 to display the shared digital item to a user. In one example, the code segments 948, when executed, may display a shared digital item and indicate whether a user with whom the digital item has been, or is being shared, is on-line. As such, the code segments 948 may implement a process similar to, or including aspects of, process 400A of FIG. 4A. In another example, the code segments 948, when executed, may display a user interface similar to, or including aspects of, user interfaces 400, 600 or 800 of FIG. 4, 6 or 8, respectively.

Figure 10:
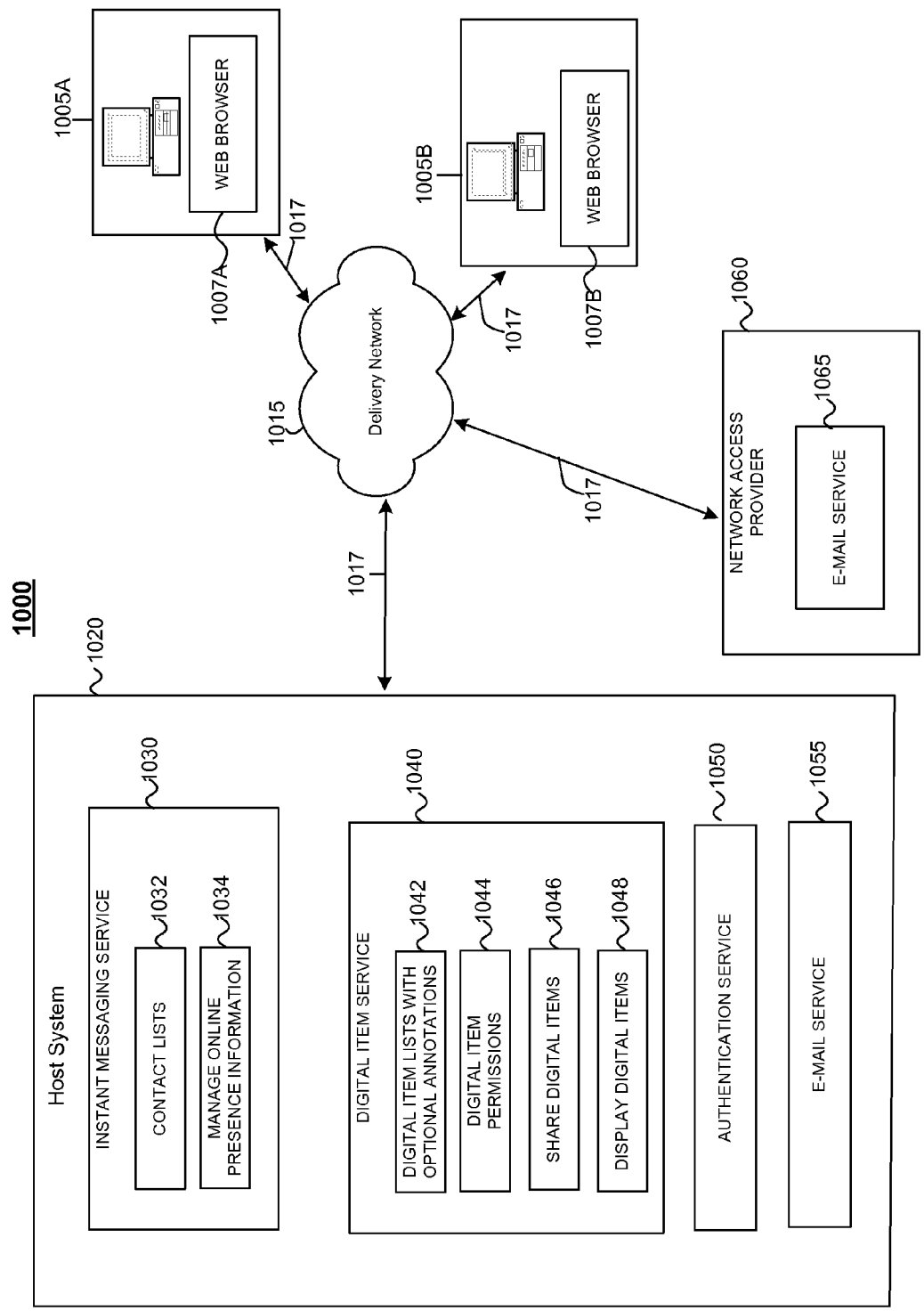

FIG. 10 depicts a communications system 1000 that is capable of allowing sharing of digital items and annotations related to the digital items. The system 1000 includes client systems 1005A and 1005B, a network 1015, and a host system 1020 capable of providing access to digital items and annotations. In contrast with the communications system 900 of FIG. 9, the system 1000 also includes a network access provider 1060, which provides access to the delivery network 1015 and an e-mail service 1065. The system 1000 enables a user of a client system to access digital items and annotations even when the user is not an authorized user of the instant messaging service 1030 provided by the host system 1020.

Each of the client systems 1005A and 1005B include a web browser 1007A or 1007B capable of communicating with the host system 1020 through the delivery network 1015.

The host system 1020 includes an instant messaging service 1030 and a digital item service 1040. The instant messaging service includes contact lists 1032 and code segments 1034 for managing on-line presence information. In the example of system 1000, the instant messaging service 1030 is operable to enable instant messages to be exchanged only between users who are registered users (or otherwise authorized users) of the instant messaging service 1030.

The digital item service 1040 enables users to share digital items and annotations with other users, even when a user is not a registered user of the instant messaging service. The digital item service 1040 includes a storage area 1042 for storing a user's lists of digital items and annotations and a data store 1044 for permissions. The digital item service 1040 also includes code segments 1046 that, when executed, enable an owner of a digital item to indicate that one or more other users are permitted to access the digital item or annotation, even when one or more of the other users are not registered users of the instant messaging service 1030.

The digital item service 1040 includes code segments 1048 to display a shared digital item to a user. The code segments 1048, when executed, may display a shared digital item and indicate whether a user with whom the digital item has been, or is being shared, is on-line. In such a case, the digital item service 1040 may indicate that a user is on-line only when the user is a registered user of the instant messaging service 1030 and is on-line. In some implementations, the digital item service 1040 may not indicate that a user who is not a registered instant messaging user is on-line even when the user is on-line and accessing the digital item service 1040. A user for whom online presence information is not available (such as a user who is not a registered user of the instant messaging service 1040), for example, may be identified as being "offline" regardless of whether the user is on-line or may be identified as having an unknown presence status.

In some implementations, the digital item service 1040 may be able to indicate when a user is on-line and accessing the digital item service 1040, even when the user is not a registered user of the instant messaging service 1030. This may be accomplished, for example, by managing on-line presence information for authenticated users who are permitted to access the digital item service 1040 and who are not registered users of the instant messaging service 1030.

In contrast with the communications system 900 of FIG. 9, the host system 1020 includes an authentication service 1050 capable of authenticating a user of a client system 1005A or 1005B, who is not an authorized user of the instant messaging service 1030. The host system 1020 also includes an e-mail service 1055 that enables a user of a client system 1005A or 1005B to send an e-mail message to another user, who need not necessarily be a registered user of the instant messaging service 1030.

In one example, the network access provider 1060 provides access to the delivery network 1015 to the client system 1005B, enabling a user of the client system 1005B to access an e-mail service 1065 and the host system 1020. In this example, the user of the client system 1005B is not a registered user of the instant messaging service 1030, whereas the user of client system 1005A is a registered user of the instant messaging service 1030. The user of client system 1005A is the owner of a list of digital items accessible through the digital item service 1040.

The user of client system 1005A accesses the host system 1020 and executes code segments 1046 to indicate that the user of client system 1005B is permitted to access a digital item or notes related to the digital item that are owned by the user of client system 1005A. To do so, for example, the user of client system 1005A may execute code segments 1046 to share digital items with the user of client system 1005B and, during the process, may identify the user of client system 1005B by the e-mail address assigned to the user of client system 1005B by the e-mail service 1065. In another example, the user of client system 1005A may identify the user of client system 1005B by a user identifier assigned by the digital item service for use with the digital item service during the share process performed by execution of code segments 1046. In some implementations, the user identifier assigned by the digital item service may be associated with another user identifier, such as an e-mail address or instant message screen name provided by an instant messaging service other than the instant messaging service 1030.

The user of client system 1005A may use the e-mail service 1055 to send an e-mail message to the user of client system 1005B for the purpose of notifying the user of client system 1005B that a digital item or annotation has been shared with the user. The e-mail message sent to the user of client system 1005B may include instructions for accessing the shared item and/or a control operable to access the shared item. Examples of such a control include a link to a web page enabling access the digital item service 1040 and a link to a web page to access a particular digital item or a particular list accessible through the digital item service 1040.

To access the shared digital item or annotation, the user of the client system 1005B may access the host system 1020 over the delivery network 1015. The host system 1020 uses the authentication service 1050 to authenticate the user of the client system 1005B. The authentication service 1050 may implement an open naming standard or industry convention for authenticating a user identity. In this manner, the host system 1020 is able to authenticate the user of the client system 1005B who is not a registered user of the instant messaging service 1030. The user of client system 1005B, once authenticated, is permitted to access digital items and annotations using the digital item service 1040. In some implementations, the user of client system 1005B, although not a registered user of the instant messaging service 1030, is able to create and share digital items and annotations with other users.

In some implementations, messaging systems other than e-mail systems may be used to communicate with a user who has been granted permission to access a digital item or annotation. For example, a text messaging system or a telephonic system (such as a system capable of sending voice mail messages) may be used.

In some implementations, the host system 1020 may not include an instant messaging service 1030. Alternatively or additionally, a third-party may provide a digital item service that uses one or more instant messaging services provided by one or more instant messaging providers. For example, a digital item service may enable a user of the digital item service to contact other users of the digital item service using various messaging means, including a first instant messaging service offered by a first instant message service provider, a second instant messaging service offered by a second instant message service provider, a text messaging service offered by a mobile communications service provider, and an e-mail message service offered by an e-mail service provider. Additionally or alternatively, the users may access the digital item service through various network access providers.

The techniques and concepts generally have been described in the context of an instant messaging system that uses an instant messaging host system to facilitate the instant messaging communication between instant message senders and instant message recipients. Other instant message implementations are contemplated, such as an instant message service in which instant messages are exchanged directly between an instant message sender system and an instant message recipient system. Although discussed above primarily with respect to instant message applications, other implementations are contemplated for providing similar functionality in platforms and on-line applications.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language; or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method comprising:
providing, to a first user of a social networking system, access to a digital item shared through the social networking system by a second user of the social networking system;
identifying a selection by the first user to share the digital item shared through the social networking system by the second user of the social networking system;
identifying a sharing setting associated with the digital item, the sharing setting being set by the second user and wherein the sharing setting dictates that access to the digital item is to be limited to a subset of users of the social networking system; and
if the sharing setting grants permission to the first user to share the digital item, sharing the digital item with users of the social networking system who are friends of the first user of the social networking system.

2. The method as recited in claim 1, wherein sharing the digital item with the users of the social networking system who are friends of the first user of the social networking system comprises providing access to the digital item to the users of the social networking system who are friends of the first user of the social networking system.

3. The method as recited in claim 2, further comprising sending a notification of the sharing of the digital item by the first user, via the social networking system, to the users of the social networking system who are friends of the first user of the social networking system.

4. The method as recited in claim 1, wherein sharing the digital item via the social networking system with the users of the social networking system who are friends of the first user of the social networking system comprises providing access to the digital item and comments associated with the digital item to the friends of the first user of the social networking system.

5. The method of claim 1, wherein the subset of users of the social networking system comprises family of the first user.

6. The method as recited in claim 1, wherein the digital item comprises a digital photograph.

7. The method as recited in claim 1, wherein the digital item comprises a video.

8. A system comprising:
at least one processor; and
at least one non-transitory computer-readable storage medium storing instructions thereon that, when executed by the at least one processor, cause the system to:
provide, to a first user of a social networking system, access to a digital item shared through the social networking system by a second user of the social networking system;
identify a selection by the first user to share the digital item shared through the social networking system by the second user of the social networking system;
identify a sharing setting associated with the digital item, the sharing setting being set by the second user and wherein the sharing setting dictates that access to the digital item is to be limited to a subset of users of the social networking system; and
if the sharing setting grants permission to the first user to share the digital item, share the digital item with users of the social networking system who are friends of the first user of the social networking system.

9. The system as recited in claim 8, further comprising instructions that, when executed by the at least one processor, cause the system to share the digital item with the users of the social networking system who are friends of the first user of the social networking system by providing access to the digital item to the users of the social networking system who are friends of the first user of the social networking system.

10. The system as recited in claim 9, further comprising instructions that, when executed by the at least one processor, cause the system to send a notification of the sharing of the digital item by the first user, via the social networking system, to the users of the social networking system who are friends of the first user of the social networking system.

11. The system as recited in claim 8, further comprising instructions that, when executed by the at least one processor, cause the system to share the digital item via the social networking system with the users of the social networking system who are friends of the first user of the social networking system by providing access to the digital item and comments associated with the digital item to the users of the social networking system who are friends of the first user of the social networking system.

12. The system as recited in claim 8, further comprising instructions that, when executed by the at least one processor, cause the system to:
receive, from a first friend of the first user, a comment directed toward the digital item; and
add the comment to a list of comments associated with the digital item.

13. The system as recited in claim 12, further comprising instructions that, when executed by the at least one processor, cause the system to:
receive, from a second friend of the first user, a request to access the digital item; and
provide the second friend of the first user with the digital item and the list of comments associated with the digital item including the comment received from the first friend.

14. A non-transitory computer readable medium storing instructions thereon that when executed by at least one processor, cause a computer system to perform steps comprising:
providing, to a first user of a social networking system, access to a digital item shared through the social networking system by a second user of the social networking system;
identifying a selection by the first user to share the digital item shared through the social networking system by the second user of the social networking system;

identifying a sharing setting associated with the digital item, the sharing setting being set by the second user and wherein the sharing setting dictates that access to the digital item is to be limited to a subset of users of the social networking system; and if the sharing setting grants permission to the first user to share the digital item, sharing the digital item with users of the social networking system who are friends of the first user of the social networking system.

15. The non-transitory computer readable medium as recited in claim 14, wherein sharing the digital item via the social networking system with the users of the social networking system who are friends of the first user of the social networking system comprises providing access to the digital item to the users of the social networking system who are friends of the first user of the social networking system.

16. The non-transitory computer readable medium as recited in claim 15, the steps further comprising sending a notification of the sharing of the digital item by the first user, via the social networking system, to the users of the social networking system who are friends of the first user of the social networking system.

17. The non-transitory computer readable medium as recited in claim 14, wherein sharing the digital item via the social networking system with the users of the social networking system who are friends of the first user of the social networking system comprises providing access to the digital item and comments associated with the digital item to the users of the social networking system who are friends of the first user of the social networking system.

18. The method as recited in claim 1, further comprising:
receiving, from a first friend of the first user, a comment directed toward the digital item;
adding the comment to a list of comments associated with the digital item;
receiving, from a second friend of the first user, a request to access the digital item; and
providing the second friend of the first user with the digital item and the list of comments associated with the digital item including the comment received from the first friend.

19. The non-transitory computer readable medium as recited in claim 14, the steps further comprising:
receiving, from a first friend of the first user, a comment directed toward the digital item; and
adding the comment to a list of comments associated with the digital item.

20. The non-transitory computer readable medium as recited in claim 18, further comprising:
receiving, from a second friend of the first user, a request to access the digital item; and
providing the second friend of the first user with the digital item and the list of comments associated with the digital item including the comment received from the first friend.

* * * * *